United States Patent
Dipper et al.

(10) Patent No.: US 9,471,662 B2
(45) Date of Patent: Oct. 18, 2016

(54) HOMOGENEITY EVALUATION OF DATASETS

(71) Applicants: Stefan Dipper, Wiesloch (DE); Michael Wilking, Zuzenhausen (DE); Ingo Raasch, Hockenheim (DE); Frank Klingl, Heidelberg (DE)

(72) Inventors: Stefan Dipper, Wiesloch (DE); Michael Wilking, Zuzenhausen (DE); Ingo Raasch, Hockenheim (DE); Frank Klingl, Heidelberg (DE)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 13/925,576

(22) Filed: Jun. 24, 2013

(65) Prior Publication Data

US 2014/0379742 A1    Dec. 25, 2014

(51) Int. Cl.
    *G06F 17/30* (2006.01)

(52) U.S. Cl.
    CPC ... *G06F 17/30595* (2013.01); *G06F 17/30489* (2013.01)

(58) Field of Classification Search
    CPC .................. G06F 17/30412; G06F 17/30595; G06F 17/30489; G06F 17/30536
    See application file for complete search history.

(56) References Cited

U.S. PATENT DOCUMENTS

| | | | |
|---|---|---|---|
| 5,842,213 A | 11/1998 | Odom et al. | |
| 5,852,821 A | 12/1998 | Chen et al. | |
| 6,205,451 B1 * | 3/2001 | Norcott | G06F 17/30457 |
| 6,252,995 B1 * | 6/2001 | Takamori | G06T 5/004 382/254 |
| 6,289,336 B1 * | 9/2001 | Melton | G06F 17/30439 705/7.29 |
| 6,370,520 B1 * | 4/2002 | Ruutu | H04L 47/10 |
| 6,493,728 B1 * | 12/2002 | Berger | H03M 7/30 |
| 6,738,755 B1 * | 5/2004 | Freytag | G06F 17/30469 |
| 6,983,291 B1 * | 1/2006 | Cochrane | G06F 17/30489 707/625 |
| 7,096,206 B2 | 8/2006 | Hitt | |
| 7,249,118 B2 * | 7/2007 | Sandler et al. | |
| 7,313,561 B2 | 12/2007 | Lo et al. | |
| 7,606,828 B2 | 10/2009 | Koerner et al. | |
| 7,873,673 B2 | 1/2011 | Cleveland et al. | |
| 8,396,788 B2 | 3/2013 | Anke | |
| 2002/0111955 A1 * | 8/2002 | Colby | G06F 17/30457 |
| 2003/0145014 A1 | 7/2003 | Minch | |
| 2004/0111410 A1 | 6/2004 | Burgoon et al. | |
| 2005/0108294 A1 * | 5/2005 | Koerner | G06F 17/30592 |
| 2007/0233637 A1 * | 10/2007 | Corvinelli | G06F 17/30536 |
| 2008/0306798 A1 | 12/2008 | Anke et al. | |
| 2009/0083302 A1 * | 3/2009 | Hampton | G06F 17/30958 |
| 2009/0106440 A1 * | 4/2009 | Srinivasan | G06F 17/30516 709/231 |
| 2010/0146008 A1 * | 6/2010 | Jacobsen | G06F 17/30489 707/802 |
| 2012/0084287 A1 * | 4/2012 | Lakshminarayan | G06F 17/30536 707/737 |
| 2012/0239609 A1 | 9/2012 | Zhao et al. | |

FOREIGN PATENT DOCUMENTS

| | | |
|---|---|---|
| EP | 2040180 A1 | 3/2009 |
| EP | 2469423 A1 | 6/2012 |
| WO | WO-2007144148 A1 | 12/2007 |

* cited by examiner

*Primary Examiner* — Jacinta M Crawford
*Assistant Examiner* — Phong Nguyen
(74) *Attorney, Agent, or Firm* — Buckley, Maschoff & Talwalkar LLC

(57) ABSTRACT

A system includes reception of an instruction to evaluate homogeneity of a first set of values of a plurality of stored sets of values, determination of a first minimum of the first set of values, determination of a first maximum of the first set of values, determination of whether the first minimum and the first maximum are equal, and if it is determined that the first minimum and the first maximum are equal, return of a value equal to the first minimum and the first maximum in response to the instruction.

18 Claims, 7 Drawing Sheets

HOMOGENEITY EVALUATION OF DATASETS

BACKGROUND

Aggregation operations are geneFrally used to determine a value based on a set of values. Common examples of aggregation operations include sum, maximum, minimum, count, etc. Other known aggregation operations include "No Operation" aggregations, which evaluate the homogeneity of a set of values. NO2 and NOP are two known varieties of "No Operation" aggregations.

The NO2 operation examines a set of values and, if all of the values are equal to a single value, outputs the single value. Otherwise, the NO2 operation outputs an "inhomogeneity indicator", which may consist of any predetermined flag or value. Similarly, the NOP operation outputs the single value if all of the values are either equal to a single value or zero, and outputs the inhomogeneity indicator if not.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
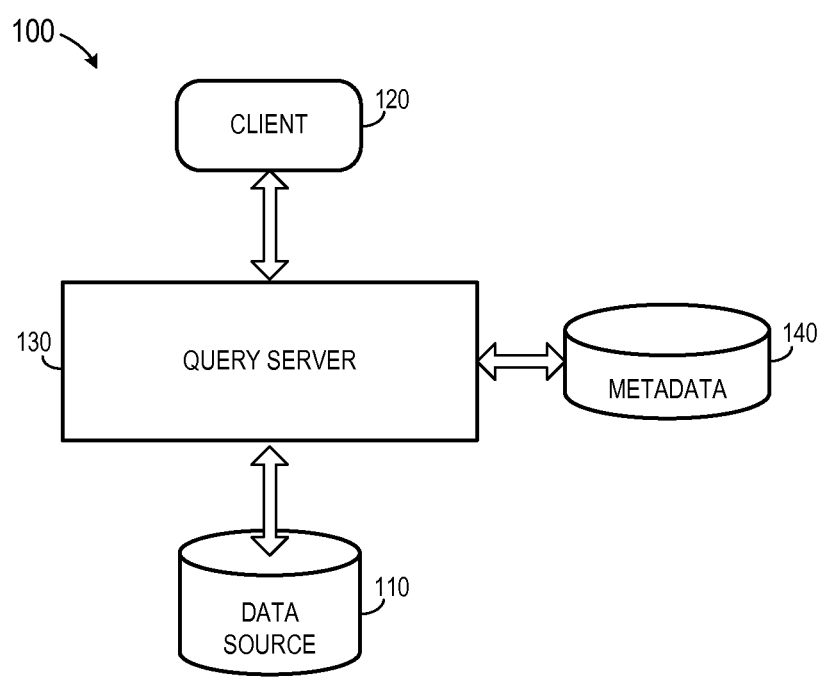
FIG. 1 is a block diagram of a system according to some embodiments.

FIG. 1 is a block diagram of system 100 according to some embodiments. System 100 includes data source 110, client 120, and query server 130. Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. The data of data source 110 may be distributed among several relational databases, multi-dimensional databases, and/or other data sources. Embodiments are not limited to any number or types of data sources. For example, data source 110 may comprise one or more OnLine Analytical Processing (OLAP) databases (i.e., cubes), spreadsheets, text documents, presentations, etc.

In some embodiments, data source 110 is implemented in Random Access Memory (e.g., cache memory for storing recently-used data) and one or more fixed disks (e.g., persistent memory for storing the full database). Alternatively, data source 110 may implement an "in-memory" database, in which volatile (e.g., non-disk-based) memory (e.g., Random Access Memory) is used both for cache memory and for storing the full database during operation, and one or more fixed disks are used for persistence and backup. In some embodiments, the data of data source 110 may comprise one or more of conventional tabular data, row-based data stored in row format, column-based data stored in columnar format, and object-based data. Data source 110 may also or alternatively support multi-tenancy by providing multiple logical database systems which are programmatically isolated from one another. Moreover, the data of data source 110 may be indexed and/or selectively replicated in an index to allow fast searching and retrieval thereof.

Metadata 140 may provide information regarding the structure, relationships and meaning of the data stored within data source 110. This information may be generated by a database administrator. According to some embodiments, metadata 140 includes data defining the schema of database tables stored within data source 110. A database table schema may specify the name of the database table, columns of the database table, the data type associated with each column, and other information associated with the database table.

Query server 130 generally provides data of data source 110 to reporting clients, such as client 120, in response to instructions (e.g., SQL statements) received therefrom. In some embodiments, query server 130 receives an instruction from client 120 to analyze a set of values, such as the values stored in a column of a database table. Query server 130 generates a statement execution plan based on the instruction and on metadata 140. The plan is forwarded to data source 110, which executes the plan and returns a dataset based on the plan. Query server 130 then returns the dataset to client 120. Embodiments are not limited thereto.

Client 120 may comprise one or more devices executing program code of a software application for presenting user interfaces to allow interaction with query server 130. Presentation of a user interface may comprise any degree or type of rendering, depending on the type of user interface code generated by query server 130. For example, client 120 may execute a Web Browser to receive a Web page (e.g., in HTML format) from query server 130, and may render and present the Web page according to known protocols. Client 120 may also or alternatively present user interfaces by executing a standalone executable file (e.g., an .exe file) or code (e.g., a JAVA applet) within a virtual machine.

Figure 2:
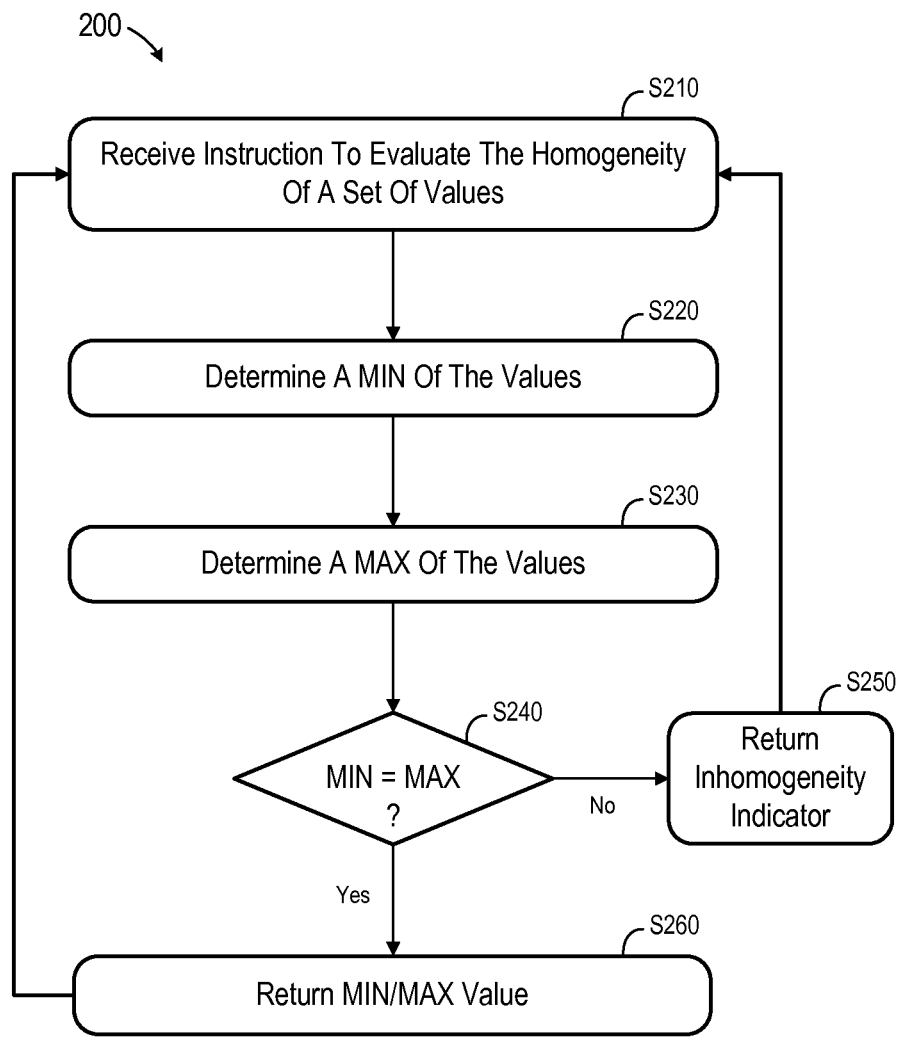
FIG. 2 is a flow diagram of a process according to some embodiments.

FIG. 2 comprises a flow diagram of process 200 according to some embodiments. In some embodiments, various hardware elements of query server 130 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, an instruction to evaluate the homogeneity of a set of values is received at S210. For purposes of the present example, it will be assumed that the instruction comprises an instruction to perform the NO2 operation on the set of values. The instruction may comprise a relational statement such as an SQL statement, but any protocol or instruction type may be utilized in some embodiments.

The instruction may be received by query server 130 from client 120. For example, a user may operate client 120 to determine whether a set of values in the "Price" column of a database table is homogeneous. The set of values may include all values in the Price column or only those values associated with certain filter criteria. As a non-exhaustive example, the set of values may include all prices associated with a particular product having particular features (e.g., blue shoes sold in Germany). Embodiments are not limited to the aggregation of values of a single database column. Client 120 may pass the instruction to query server 130 by calling an interface exposed thereby.

At S220, a MIN aggregation operation is performed upon the set of values. This operation may consist of retrieving the set of values from data source 110 and determining the minimum value thereof, or may include requesting data source 110 to determine and return the minimum value of the set of values.

A MAX aggregation operation is performed upon the set of values at S230. Again, the MAX operation may consist of retrieving the set of values from data source 110 and determining the maximum value thereof, or may include requesting data source 110 to determine and return the maximum value of the set of values.

According to some embodiments, S220 and S230 may be performed simultaneously via a single SQL statement. For example, assuming the values are located in table DATA:

CREATE table DATA_1 (logical_key VARCHAR(30) primary key, measure double);

Then the MIN and MAX values can be retrieved with the following SQL statement:

SELECT MIN(measure) as min_measure, MAX(measure) as max_measure from DATA_1

Next, at S240, it is determined whether the MAX and MIN values are equal. If not, the set of values are not homogeneous and an inhomogeneity indicator (e.g., '*' or 'X') is returned to client 120 at S250. If the MAX and MIN values are equal, flow proceeds from S240 to S260 to return the equal value to client 120. Flow returns to S210 from S250 or S260 to await another instruction as described above.

According to some embodiments, the instruction received at S210 comprises an instruction to perform the NOP operation on the set of values. In such an embodiment, steps S220 and S230 may be performed using the following SQL:

SELECT MIN(case when measure <>0 then measure else NULL end) as min_measure, MAX(case when measure <>0 then measure else NULL end) as max_measure from DATA_1

The above SQL returns the minimum and maximum of all non-zero measure values. From S240 flow proceeds to S250 if the maximum and minimum values are not equal. If the values are equal, the equal value is returned at S260 as described above.

Figure 3A:
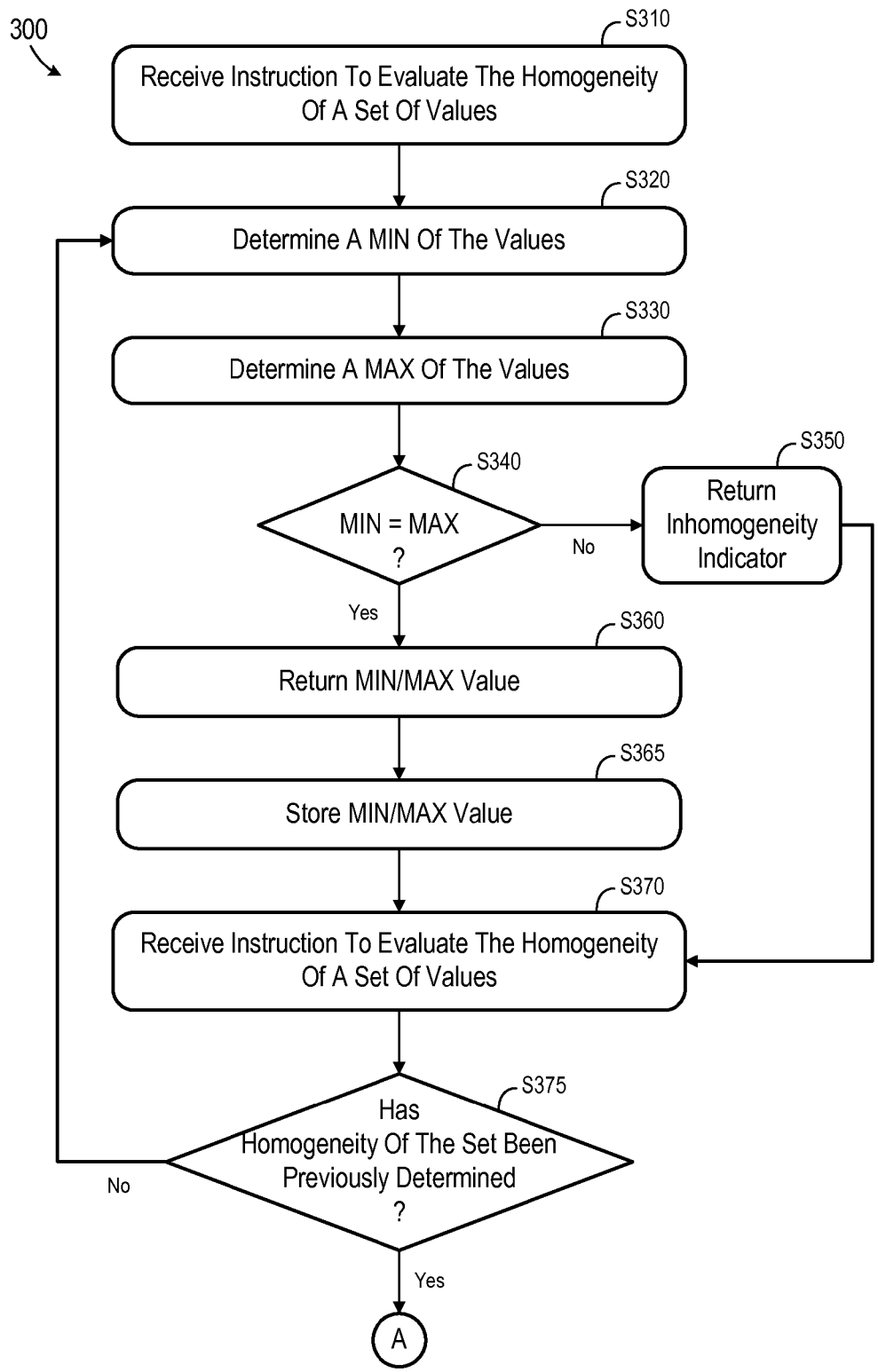
FIGS. 3A and 3B comprise a flow diagram of a process according to some embodiments.
Figure 3B:
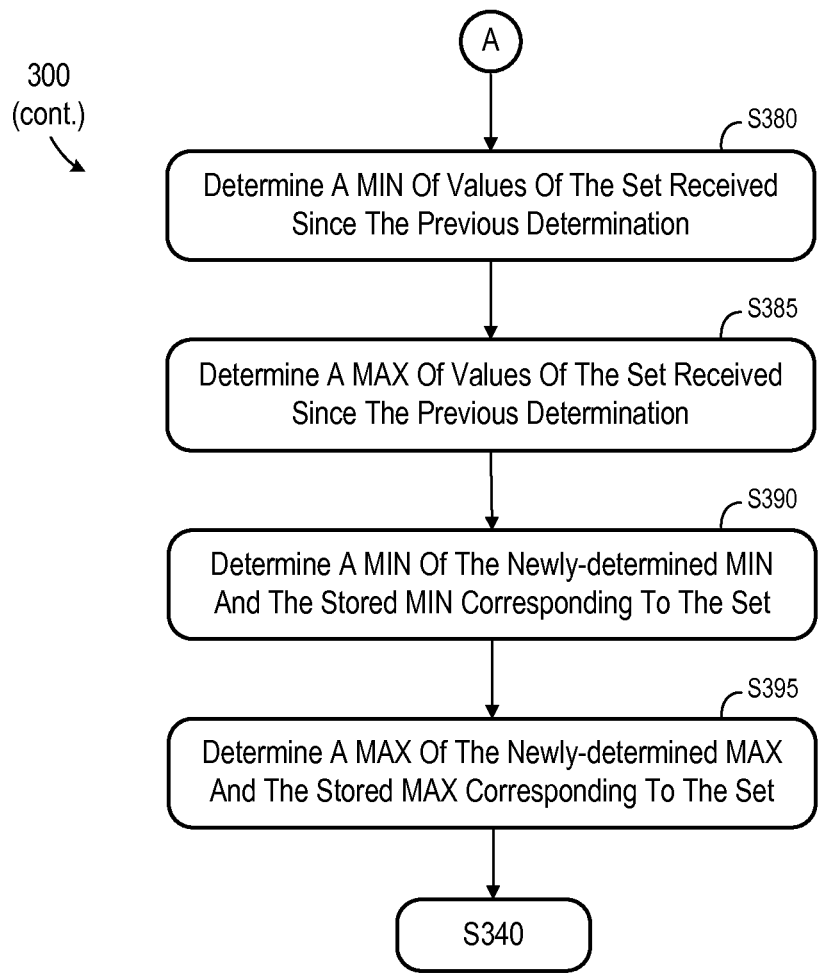

FIGS. 3A and 3B comprises a flow diagram of process 300 according to some embodiments. In some embodiments, various hardware elements of query server 130 execute program code to perform process 300. Some embodiments of process 300 may provide efficient execution of a No Operation aggregation on changed data. Such data might be accessible separately from previously-aggregated data (e.g., in a "delta-enabled" architecture).

S310 through S360 may proceed as described above with respect to S210 through S260 of process 200. Accordingly, descriptions thereof are omitted for the sake of brevity.

Figure 4:
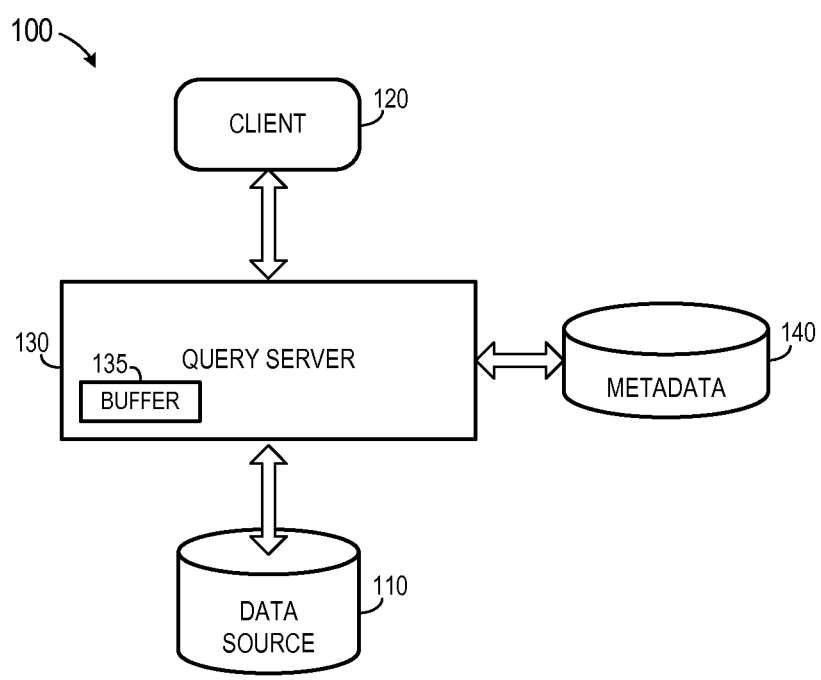
FIG. 4 is a block diagram of a system according to some embodiments.

If the maximum and minimum values are determined to be equal and the equal value is returned at S360, the value is also stored at S365. FIG. 4 illustrates system 100 of FIG. 1, with the addition of buffer 135 of query server 130. According to some embodiments, the value is stored in buffer 135 at S365.

The value may be stored at S365 in association with information indicating the set of values to which the value relates. For example, the value may be associated with identifying information of the set of values (e.g., prices of blue shoes sold in Germany) as well as with a temporal or other indicator of the dataset from which the set of values was obtained. According to some embodiments, the indicator is a data package identifier which indicates a latest-received data package represented in the dataset.

Next, at S370, another instruction to evaluate the homogeneity of a set of values is received. It is also noted that flow proceeds directly from S350 to S370 if the first set of values is determined to be inhomogeneous. The instruction received at S370 may specify any set of values. In this regard, it is determined at S375 whether the homogeneity of the set of values has been previously determined If not, flow returns to S320 and continues through S360 as described with respect to process 200.

Flow continues to S380 if the homogeneity of the set of values has been previously determined. A minimum of the set of values is determined at S380. However, the values of the set which are evaluated at S380 only include those values which have been received by data source 110 since the previous determination of the minimum of the set of values.

Figure 5:
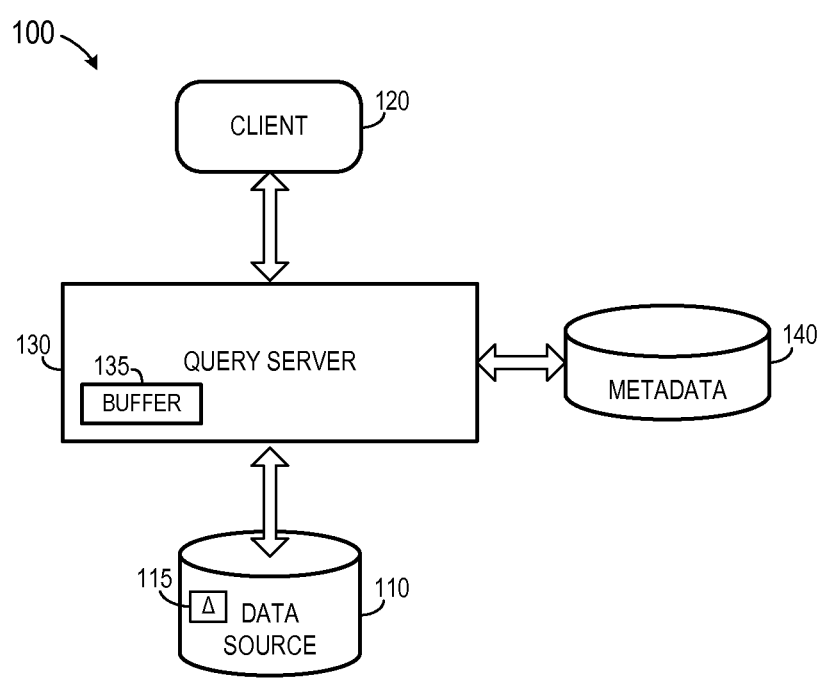
FIG. 5 is a block diagram of a system according to some embodiments.

FIG. 5 continues the present example of process 300, in which data source 110 now includes delta 115. Delta 115 may include values of the set of values (e.g., prices of blue shoes sold in Germany) which were added to data source 110 since the previous determination of the minimum of this set of values.

Accordingly, S380 may comprise determining the minimum value of delta 115. The values of delta 115 may be identified by filtering on a timestamp (i.e., all values of the set which have a timestamp after the latest timestamp of the previously-evaluated values), by filtering on a data package identifier (i.e., all values of the set which are associated with a data package identifier greater than the largest data package identifier of the previously-evaluated values), or by other means.

Next, at S385, a maximum of values which have been received by data source 110 since the previous determination of the maximum of the set of values is determined Such a determination may proceed as described with respect to S380.

At S390, a minimum is determined between the minimum value determined at S380 and the previously-stored minimum value of the set of values. Similarly, a maximum is determined at S395 between the maximum value determined at S385 and the previously-stored maximum value of the set of values. Flow then returns to S340 to return a single value if the maximum is equal to the minimum or to return the inhomogeneity indicator if the values are not equal.

Although process 300 was described in the context of an NO2 aggregation operation, it is noted that process 300 may be modified as described above to execute an NOP aggregation.

Figure 6:
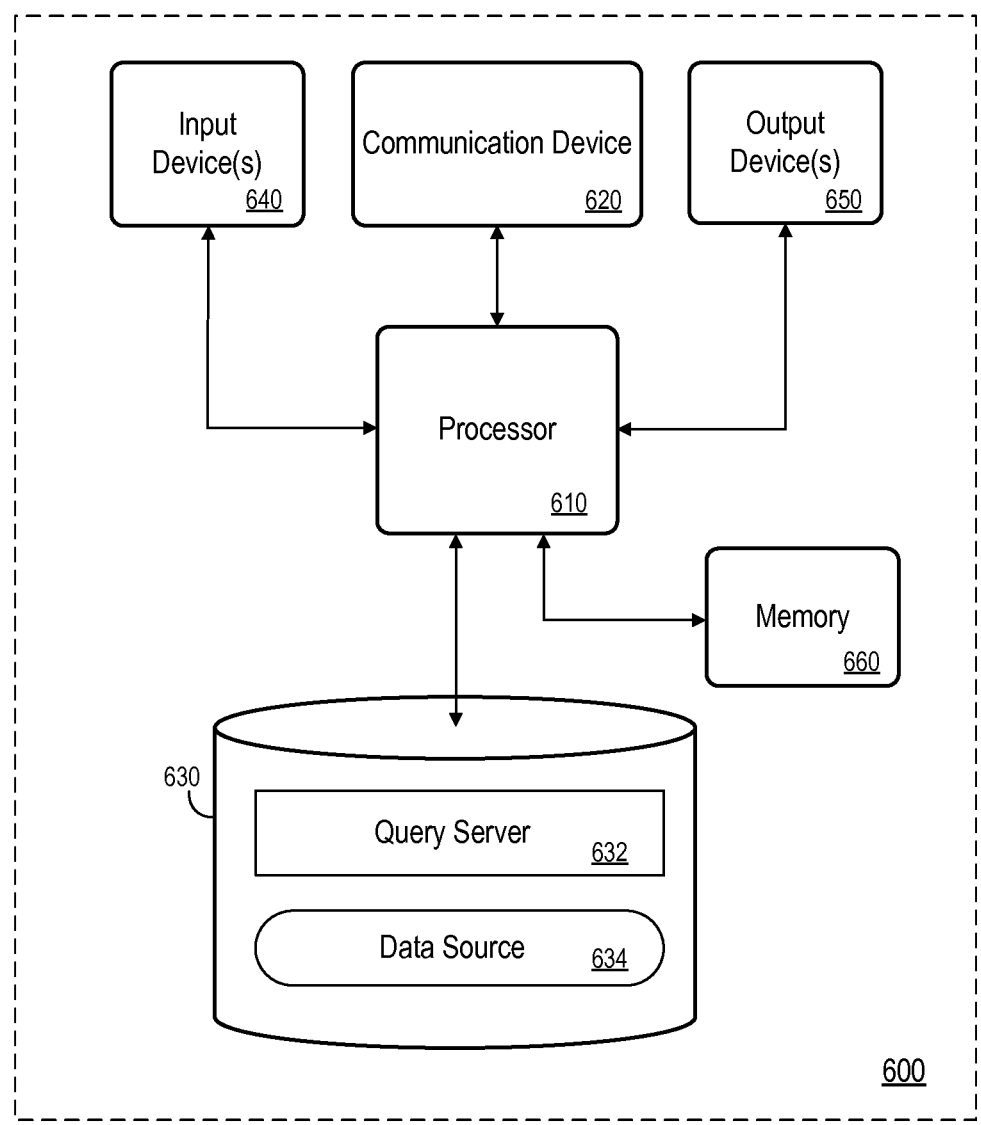
FIG. 6 is a block diagram of an apparatus according to some embodiments.

FIG. 6 is a block diagram of system 600 according to some embodiments. System 600 may comprise a general-purpose computing system and may execute program code to perform any of the processes described herein. System 600 may comprise an implementation of query server 130 and data source 110, or of the entirety of system 100. System 600 may include other unshown elements according to some embodiments.

System 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Query server 632 may comprise program code executed by processor 610 to cause apparatus 600 to perform any one or more of the processes described herein. Embodiments are not limited to execution of these processes by a single apparatus. Data source 634 may implement data source 110 as described above. As also described above, data source 110 may be implemented in volatile memory such as memory 660. Data storage device 630 may also store data and other program code for providing additional functionality and/or which are necessary for operation of system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
 a database data storage device storing a plurality of sets of values of a database;
 a memory storing processor-executable program code; and
 a query server including a processor to execute the processor-executable program code in order to cause the computing system to:
  evaluate the homogeneity of a first set of values of the plurality of sets of values by:
   receiving an instruction to evaluate homogeneity of a first set of values of the plurality of sets of values;
   performing a MIN aggregation operation to determine a first minimum of the first set of values;
   performing a MAX aggregation operation to determine a first maximum of the first set of values;
   determining whether the first minimum and the first maximum are equal;
   if it is determined that the first minimum and the first maximum are equal, returning a value equal to the first minimum and the first maximum in response to the instruction;
   storing the returned value;
  evaluate the homogeneity of the first set of values of the plurality of sets of values, wherein the first set of values includes additional values added to the first set of values since the first minimum and first maximum determinations by:
   receiving a second instruction to evaluate homogeneity of the first set of values of the plurality of sets of values, wherein the first set of values includes additional values added to the first set of values since the first minimum and first maximum determinations; and
  in response to the second instruction, evaluating the homogeneity by:
   determining a second minimum of only the values added to the first set of values since the determination of the first minimum, and
   determining a second maximum of only the values added to the first set of values since the determination of the first maximum.

2. The computing system according to claim 1, wherein the processor is further to execute the processor-executable program code in order to cause the computing system to:
 if it is determined that the first minimum and the first maximum are not equal, return an inhomogeneity indicator in response to the instruction.

3. The computing system according to claim 1, wherein the processor is further to execute the processor-executable program code in order to cause the computing system to:
 determine whether the second minimum and the second maximum are equal; and
 if it is determined that the second minimum and the second maximum are equal, return a value equal to the second minimum and the second maximum in response to the second instruction.

4. The computing system according to claim 1, wherein the returned value is stored in a non-volatile memory.

5. The computing system according to claim 1, wherein the processor is further to execute the processor-executable program code in order to cause the computing system to:
 determine whether the first minimum and the first maximum are equal and equal to zero; and
 if it is determined that the first minimum and the first maximum are equal and equal to zero, return an inhomogeneity indicator in response to the instruction.

6. The computing system of claim 1, wherein the processor is further to execute the processor-executable program code in order to cause the computing system to:

determine a third minimum of the second minimum of values of the first set and the first minimum of values of the first set;
determine a third maximum of the second maximum of values of the first set and the first maximum of values of the first set;
determine whether the third minimum and the third maximum are equal; and
if it is determined that the third minimum and the third maximum are equal, return a value equal to the third minimum and the third maximum in response to the second instruction.

7. The computing system of claim 1, wherein the MIN aggregation operation and the MAX aggregation operation are performed simultaneously via a single SQL statement.

8. The computing system of claim 7, wherein the single SQL statement is SELECT MIN (measure) as min_measure, MAX (measure) as max_measure from DATA_1.

9. A non-transitory computer-readable medium storing program code, the program code executable by a query server including a processor of a computing system to cause the computing system to:
evaluate the homogeneity of a first set of values of the plurality of sets of values of a database by:
receiving an instruction to evaluate homogeneity of a first set of values of a plurality of stored sets of values;
performing a MIN aggregation operation to determine a first minimum of the first set of values;
performing a MAX aggregation operation to determine a first maximum of the first set of values;
determining whether the first minimum and the first maximum are equal;
if it is determined that the first minimum and the first maximum are equal, returning a value equal to the first minimum and the first maximum in response to the instruction;
storing the returned value;
evaluate the homogeneity of the first set of values of the plurality of sets of values, wherein the first set of values includes additional values added to the first set of values since the first minimum and first maximum determinations by:
receiving a second instruction to evaluate homogeneity of the first set of values of the plurality of sets of values, wherein the first set of values includes additional values added to the first set of values since the first minimum and first maximum determinations; and
in response to the second instruction, evaluating the homogeneity by:
determining a second minimum of only the values added to the first set of values since the determination of the first minimum, and
determining a second maximum of only the values added to the first set of values since the determination of the first maximum.

10. The medium according to claim 9, wherein the program code is further executable in order to cause the computing device to:
if it is determined that the first minimum and the first maximum are not equal, return an inhomogeneity indicator in response to the instruction.

11. The medium according to claim 9, wherein the program code is further executable in order to cause the computing device to:
determine whether the second minimum and the second maximum are equal; and
if it is determined that the second minimum and the second maximum are equal, return a value equal to the second minimum and the second maximum in response to the second instruction.

12. The medium according to claim 9, wherein the returned value is stored in a non-volatile memory.

13. The medium according to claim 9, wherein the program code is further executable in order to cause the computing device to:
determine whether the first minimum and the first maximum are equal and equal to zero; and
if it is determined that the first minimum and the first maximum are equal and equal to zero, return an inhomogeneity indicator in response to the instruction.

14. A computer-implemented method comprising:
evaluating the homogeneity of a first set of values of a plurality of stored sets of values of a database by:
receiving an instruction from a query server to evaluate homogeneity of a first set of values of a plurality of stored sets of values;
performing a MIN aggregation operation to determine a first minimum of the first set of values;
performing a MAX aggregation operation to determine a first maximum of the first set of values;
determining whether the first minimum and the first maximum are equal;
if it is determined that the first minimum and the first maximum are equal, returning a value equal to the first minimum and the first maximum in response to the instruction;
storing the returned value;
evaluating the homogeneity of the first set of values of the plurality of stored sets of values, wherein the first set of values includes additional values added to the first set of values since the first minimum and first maximum determinations by:
receiving a second instruction to evaluate homogeneity of the first set of values of the plurality of sets of values, wherein the first set of values includes additional values added to the first set of values since the first minimum and first maximum determinations; and
in response to the second instruction, evaluating the homogeneity by:
determining a second minimum of only the values added to the first set of values since the determination of the first minimum, and
determining a second maximum of only the values added to the first set of values since the determination of the first maximum.

15. The computer-implemented method according to claim 14, wherein the program code is further executable in order to cause the computing device to:
if it is determined that the first minimum and the first maximum are not equal, return an inhomogeneity indicator in response to the instruction.

16. The computer-implemented method according to claim 14, wherein the program code is further executable in order to cause the computing device to:
determine whether the second minimum and the second maximum are equal; and
if it is determined that the second minimum and the second maximum are equal, return a value equal to the second minimum and the second maximum in response to the second instruction.

17. The computer-implemented method according to claim 14, wherein the returned value is stored in a non-volatile memory.

18. The computer-implemented method according to claim 14, wherein the program code is further executable in order to cause the computing device to:
- determine whether the first minimum and the first maximum are equal and equal to zero; and
- if it is determined that the first minimum and the first maximum are equal and equal to zero, return an inhomogeneity indicator in response to the instruction.

* * * * *